J. Flood,
Attaching Handles to Cutlery.
N° 78,796. Patented June 9, 1868.

Witnesses

Inventor:
James Flood
By his Attorney

United States Patent Office.

JAMES FLOOD, OF NEW HAVEN, CONNECTICUT, ASSIGNOR TO WILLIAM SANDERSON, OF NEW YORK CITY.

*Letters Patent No. 78,796, dated June 9, 1868.*

IMPROVEMENT IN ATTACHING HANDLES TO CUTLERY.

*The Schedule referred to in these Letters Patent and making part of the same.*

TO ALL WHOM IT MAY CONCERN:

Be it known that I, JAMES FLOOD, of New Haven, in the county of New Haven, and State of Connecticut, have invented a new Improvement in Attaching Handles to Cutlery; and I do hereby declare the following, when taken in connection with the accompanying drawings, and the letters of reference marked thereon, to be a full, clear, and exact description of the same.

My invention relates to certain improvements in the handle-portion of cutlery-implements, such as knives, forks, &c., and is adapted particularly to that kind of handles which are made of composition.

Previous to my invention, many attempts have been made, with but partial success, in a practical point of view, to manufacture knives, forks, and other handled instruments with composition-handles, the handle-portion being moulded around the tang.

The great practical difficulty in the manufacture of a marketable article has been the want of sufficient strength in this kind of handle, the compositions which could be economically used not possessing sufficient tenacity to withstand the strain to which they are sometimes subjected in common use, while to increase the size and bulk of the tang, so as to render it perfectly rigid, and thus relieve the composition of the handle from all torsion or strain, has been found to so increase the weight of the instrument and its cost as to more than counterbalance the advantages arising from the use of the compositions moulded around the tang to form the handles.

My invention has for its objects to overcome these difficulties in the manufacture, and produce economically an article of manufacture having the handle formed of composition, moulded around the tang, which shall be light, strong, and durable; and to these ends, my invention consists in a handle formed of composition moulded around a tang, which is formed of a flattened and twisted bar of metal, so that while it is light, it is at the same time rigid, and relieves the composition of the strain which it would receive were the tang capable of springing, as will be hereinafter more fully described.

To enable those skilled in the art to make and use my invention, I will proceed to describe it more fully, referring by letters to the accompanying drawings, in which—

Figure 1:
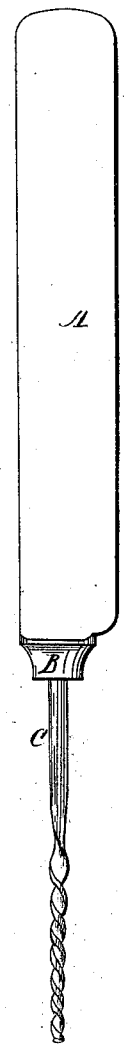
Figure 2:
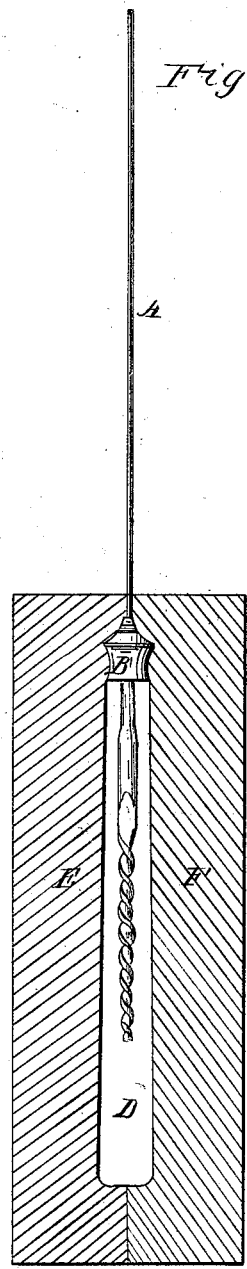

Figure 1 is an elevation of a knife-blade, bolster, and tang, embracing the feature of the twisted tang, and Figure 2 a sectional elevation, showing the same with the composition-handle moulded around it, (within moulding-dies.)

In the several figures, A is the blade, B the bolster, and C the tang of the knife, and D is the composition-handle.

The tang C is made round or cylindrical near the bolster B, but during the greater portion of its length is drawn out flat, and then twisted, as clearly illustrated, (after the fashion somewhat of a twisted drill.)

The handle D is formed of any suitable composition, shaped and compressed within dies, E F, in the manner well known to those acquainted with the manufacture of composition-handles.

By making the tang C of the form shown, it is rendered about as rigid as a tang of cylindrical form, equal about in diameter to the diameter of the twisted portion, while it is much lighter than such cylindrical tang would be, and by having the tang thus rigid, so that it cannot be sprung or bent by any strain which is likely to be brought to bear on it, the handle-portion D can be moulded of any suitable composition, and a desirable and durable article produced, (which could not be done with the same composition and a flat tang, on account of the liability of the composition to break when the tang is sprung.)

It may be remarked that the twisted form of the tang also insures its retention in the handle D.

I am aware that a tang has been made with a twist in it to hold it longitudinally within a filled encased handle, and I am also aware that a composition-handle is well known. I do not therefore wish to be understood as claiming either of these elements in the production of handled instruments; but, having explained my invention, so that those skilled in the art can make and use it,

What I claim as new in the manufacture of knives and forks, and other analogous instruments, is—

The employment of the twisted tang, in combination with the composition-handle moulded around, all substantially as described for the purpose set forth.

JAMES FLOOD.

Witnesses:
HENRY ROGERS,
A. J. TIBBBTS.